(12) United States Patent
Lehner et al.

(10) Patent No.: US 6,655,187 B1
(45) Date of Patent: Dec. 2, 2003

(54) METHOD FOR CORRECTING AN ANGLE ERROR OF AN ABSOLUTE-ANGLE SENSOR

(75) Inventors: Michael Lehner, Muehlacker (DE); Andreas Pfender, Abstatt (DE)

(73) Assignee: Robert Bosch GmbH, Stutthart (DE)

( * ) Notice: Subject to any disclaimer, the term of this patent is extended or adjusted under 35 U.S.C. 154(b) by 0 days.

(21) Appl. No.: 10/018,855

(22) PCT Filed: Jun. 10, 2000

(86) PCT No.: PCT/DE00/01914
§ 371 (c)(1), (2), (4) Date: May 16, 2002

(87) PCT Pub. No.: WO00/77374
PCT Pub. Date: Dec. 21, 2000

(30) Foreign Application Priority Data

Jun. 15, 1999 (DE) .......................... 199 27 191

(51) Int. Cl.[7] .............................. G12B 13/00
(52) U.S. Cl. ....................................... 73/1.75
(58) Field of Search ................ 73/1.75; 702/94, 702/151; 123/406.18, 406.62

(56) References Cited

U.S. PATENT DOCUMENTS

| | | | |
|---|---|---|---|
| 3,830,207 A | 8/1974 | Joseph | |
| 5,117,681 A | 6/1992 | Dosdall et al. | |
| 5,128,883 A * | 7/1992 | Neglia et al. | ............ 364/550 |
| 5,630,396 A * | 5/1997 | Fukui et al. | ............ 123/414 |
| 5,671,145 A | 9/1997 | Krebs et al. | |
| 5,881,696 A * | 3/1999 | Wada | ............ 123/406.62 |
| 6,016,789 A * | 1/2000 | Denz et al. | ............ 123/406.62 |

FOREIGN PATENT DOCUMENTS

| | | |
|---|---|---|
| DE | 197 22 016 | 12/1998 |
| DE | 197 50 024 | 5/1999 |
| EP | 0 497 237 | 8/1992 |

* cited by examiner

Primary Examiner—Hezron Williams
Assistant Examiner—C D. Garber
(74) Attorney, Agent, or Firm—Kenyon & Kenyon

(57) ABSTRACT

Method for correcting an angle error of an absolute-angle detector that detects the angular position of a first shaft whose rotary movement is linked to a second shaft. The angular position of second shaft is first detected during at least one complete revolution of first shaft; the corresponding angular position of first shaft is derived from this value; the corresponding output value of absolute-angle detector is compared to the corresponding angular position of first shaft, and the difference formed by this comparison is stored. The corresponding output value of absolute-angle detector is then corrected by the stored value.

4 Claims, 3 Drawing Sheets

METHOD FOR CORRECTING AN ANGLE ERROR OF AN ABSOLUTE-ANGLE SENSOR

FIELD OF THE INVENTION

The present invention relates to a method for correcting an angle error of an absolute-angle detector that detects the angular position of a first shaft, whose rotary movement is linked to a second shaft.

BACKGROUND INFORMATION

A method of this type is used, in particular, to detect the angle of rotation of a camshaft in an internal combustion engine. It is therefore described below in conjunction with an internal combustion engine.

To meet the functionality requirements of modern engine control systems, the speed and angular position of the crankshaft and camshaft are detected at all times with a very high degree of accuracy. A known method of detecting the crankshaft speed uses a detector disk that has sixty minus two angle marks and rotates together with the crankshaft and is scanned by a sensor. A sensor that operates on the basis of the inductive, magnetoresistive or Hall effect is regularly used as the sensor.

To obtain adequate information about the instantaneous engine cycle, the absolute camshaft position is also determined.

In today's engine control systems, the camshaft positions are detected in segments. In doing this, a disk that rotates together with the camshaft and has, for example, four angle marks, is scanned using a sensor. This sensor emits an output signal that changes levels multiple times per camshaft rotation. This provides instantaneous, angle-accurate information about the camshaft position at the segment limits, i.e., at the points where the camshaft sensor signal changes levels. Absolute angle-accurate information about the camshaft position is not available in the angular positions between the segment limits.

Continuous detection of the angle of rotation on the camshaft can help improve the engine system because the instantaneous angle information is available in the control unit at any point in time. This makes it possible to improve the functionality of existing engine control systems and implement additional functions as needed.

By detecting the angle of rotation on the camshaft, for example, the speed detector can be quickly diagnosed, or the absolute-angle detector itself can be simply and quickly diagnosed by checking the plausibility of the signal. Reliable and easy start recognition procedures can also be carried out. Engine stalling and underspeed can be reliably detected, the direction of rotation determined, and quick-start processes synchronized more quickly.

It is also possible to improve speed detector emergency operation; the engine can only be started directly when using an absolute-angle detector.

An absolute-angle detector that can be used to determine the angular position of the camshaft at any time is known from German Published Patent Application No. 197 22 016. The known absolute-angle detector uses a combination of the Hall and magnetoresistive effects. For this purpose, the known absolute-angle detector uses two sensor elements, with one operating according to the Hall principle and the other according to the magnetoresistive principle. The signals output by both sensor elements are combined with each other.

The known absolute-angle detector can be used for angle detection with little temperature dependency and little pressure dependency, at the same time achieving good resolution. It is possible to measure over a 360-degree angle, enabling the detector to be used for measuring the absolute angle of the camshaft in an internal combustion engine.

Although the known absolute-angle detector can be used to construct an engine control system that has improved quick-start characteristics, thereby relieving the battery, starter and generator and enabling smaller dimensions, while reliable detection of the direction of rotation avoids flooding of the intake manifold—enabling the intake manifold and the throttle valve, for example, to be specified according to less stringent requirements—the known absolute-angle detector does have the disadvantage that it is difficult to meet the required degree of accuracy in detecting the camshaft angle with an error of less than roughly one or two degrees of the camshaft. This is largely due to the mechanical fitting tolerance of the detector, the mechanical fitting tolerance of the magnet, the inhomogeneous magnetic field, the ovality of the camshaft, and electrical and mechanical tolerances within the sensor element.

A method for adapting construction tolerances of a detector wheel is known from German Published Patent Application No. 197 50 024, in which the actual difference between an angular position of at least one mark on the detector wheel and an angular position of at least one mark on a reference detector wheel connected to a second shaft is first determined, the actual difference of the angular position is compared to a setpoint difference, and the setpoint difference is stored as a construction error of the detector wheel. The detector wheel can be connected to a camshaft and the reference detector wheel to the crankshaft of an internal combustion engine.

Although the known method also provides for correction of an error occurring as a result of the imprecise attachment of a detector wheel, the known method does not make it possible to correct errors that occur as the result of a plurality of interrelated influences affecting an absolute-angle detector. In particular, the known method cannot be used to correct an error that occurs independently of an installation error that can be corrected with the known method; the erroneous deviation can be either positive or negative.

SUMMARY OF THE INVENTION

An object of the present invention is to provide a method that almost completely compensates for the angle error of an absolute-angle detector, with the compensation taking place in each position and over one complete revolution of the first shaft, and taking all error-influencing quantities into account.

According to the present invention, the angular position of the second shaft is first detected during at least one complete revolution of the first shaft; the corresponding angular position of the first shaft is determined from this value; the corresponding output value of the absolute-angle detector is compared to the corresponding angular position of the first shaft and the difference formed by the comparison is stored; the corresponding output value of the absolute-angle detector is then corrected by the stored value.

Because the angular position of the second shaft is first detected during at least one complete revolution of the first shaft and the corresponding angular position of the first shaft is determined from this value, all error influences that occur during one complete revolution of the first shaft can be determined. Thus, not only can a faulty attachment of a detector wheel to the first shaft be detected, but also all other tolerances that may be present in connection with an absolute-angle detector. In particular, the comparison provided according to the present invention between the corresponding output value of the absolute-angle detector and the corresponding angular position of the first shaft can be used to detect deviations that are negative, for example, at the beginning of the revolution of the first shaft and become positive during the revolution of the first shaft.

According to the present invention, the difference formed by the comparison is first stored and then the corresponding output value of the absolute-angle detector corrected by this stored value. This makes it possible to correct the output value of the absolute-angle detector as early as during the second revolution of the first shaft. The stored values can remain in memory while the engine is at a standstill, so that, when the engine is restarted, the output value of the absolute-angle detector can be corrected by the stored values as early as during the first revolution of the first shaft.

However, it is particularly advantageous to detect the error assigned to a particular angular position of the first shaft multiple times, i.e., during new interruptions of the first shaft, and form the corresponding mean value, with the mean value being stored and used for correction purposes. Mean-value formation is an advantageous way to largely eliminate any disturbance peaks that may occur. However, it is particularly advantageous to continuously detect the errors to be assigned to the different angular positions, i.e., during each revolution.

The method according to the present invention can be further improved by using a value interpolated from the two values for correcting an error that lies between two discrete values. This makes it possible to correct the output values of the absolute-angle detector even when the first shaft is in a position in which the detector used to detect the angular position of the second shaft does not output a measurement signal, as is the case when the detector is located, for example, between two teeth of a detector wheel of the second shaft.

DETAILED DESCRIPTION

Figure 1:
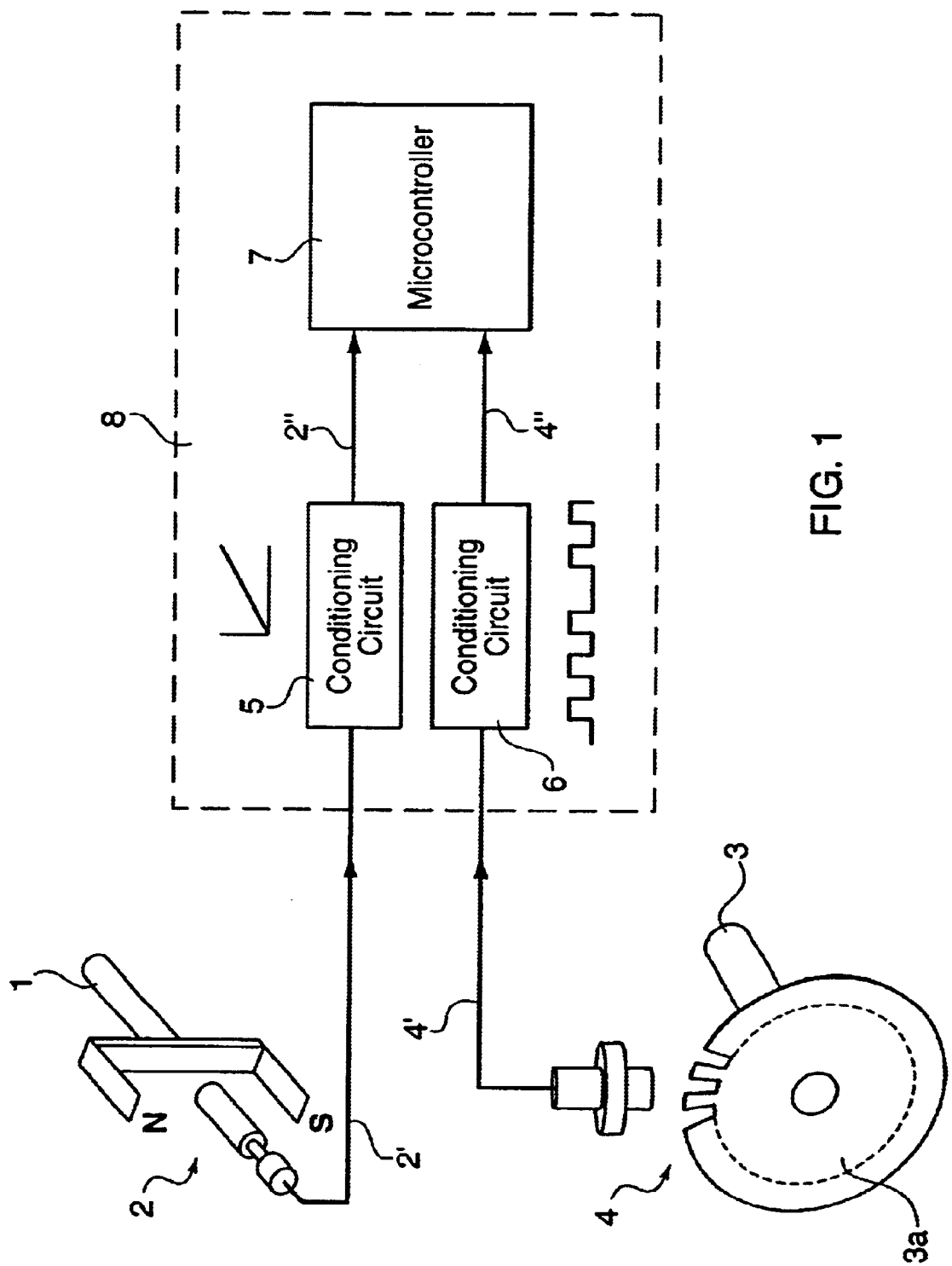
FIG. 1 shows a block diagram of an arrangement for carrying out the method according to the present invention.

As shown in FIG. 1, an absolute-angle detector 2 is provided on a camshaft 1 of an internal combustion engine. A rotary detector 4 is provided on crankshaft 3 of the internal combustion engine. Absolute-angle detector 2 uses a combination of the Hall and magnetoresistive effects. Rotary detector 4 is designed as a conventional inductive sensor which outputs a signal for each tooth edge of a detector wheel 3a connected to crankshaft 3. Output signal 2' of absolute-angle detector 2 is supplied to a first conditioning circuit 5. Output signal 4' of rotary detector 4 is supplied to a second conditioning circuit 6. Conditioned signal 2" of absolute-angle detector 2, which is output by first conditioning circuit 5, is supplied to a microcontroller 7. Conditioned signal 4" of rotary detector 4, which is output by second conditioning circuit 6, is also supplied to microcontroller 7. First conditioning circuit 5, second conditioning circuit 6, and microcontroller 7 are part of a control unit 8.

Figure 2:
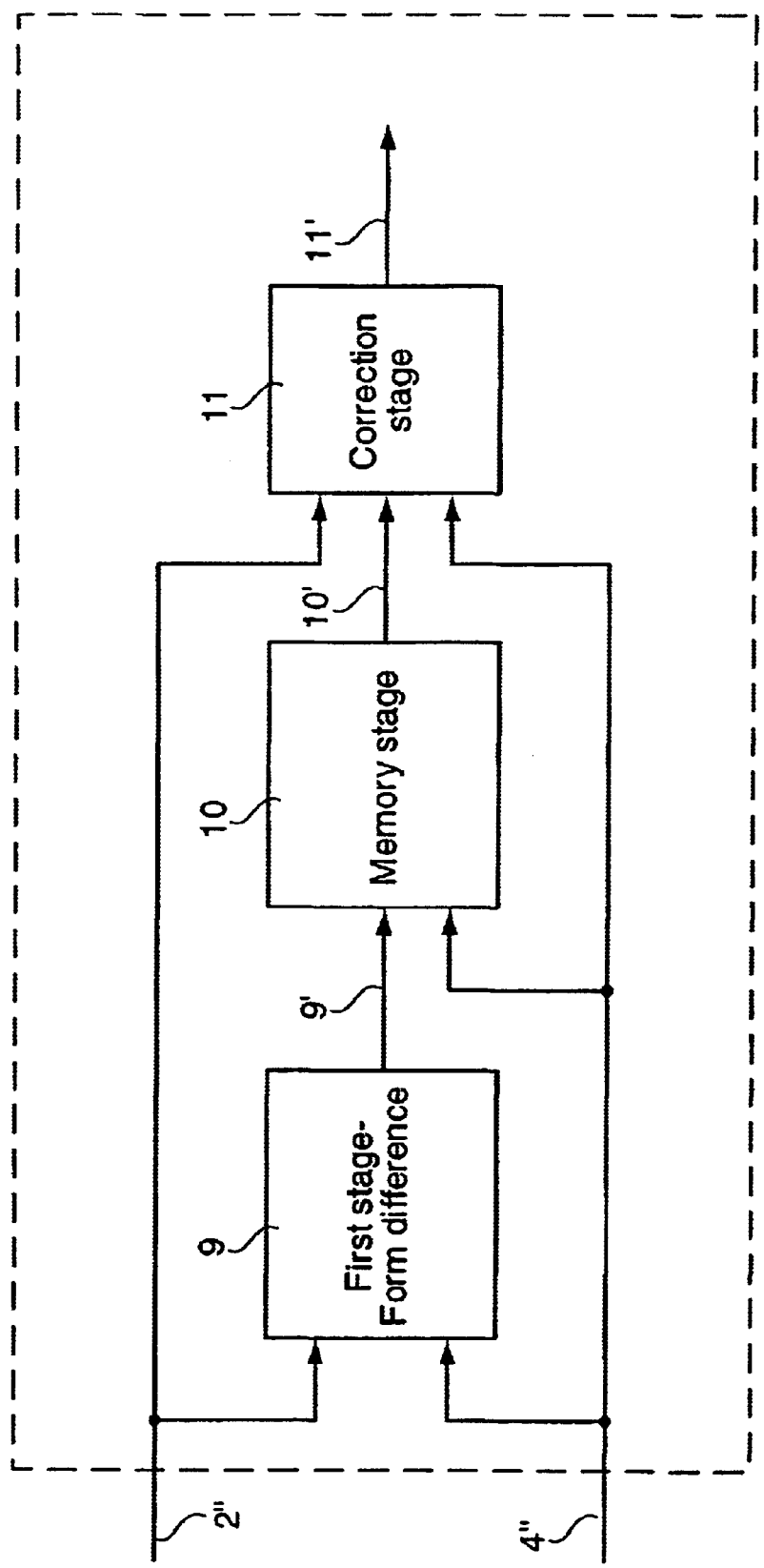
FIG. 2 shows a schematic block diagram of the microcontroller illustrated in FIG. 1.

As shown in FIG. 2, conditioned output signal 2" of absolute-angle detector 2 and conditioned output signal 4" of rotary detector 4 in microcontroller 7, as well as the difference in the output signal of absolute-angle detector 2, are formed, in a first stage 9, from the corresponding output signal of rotary detector 4, which forms a reference signal. Difference signal 9' output by first stage 9 is supplied to a memory stage 10. Correction signal 10' stored in memory stage 10 is supplied to a correction stage 11. Conditioned output signal 2' of absolute-angle detector 2 is also supplied to correction stage 11. Conditioned signal 2" of absolute-angle detector 2 is corrected by stored correction value 10' in correction stage 11. Output signal 11' emitted by correction stage 11 largely corresponds to the actual angular position of camshaft 1.

Figure 3:
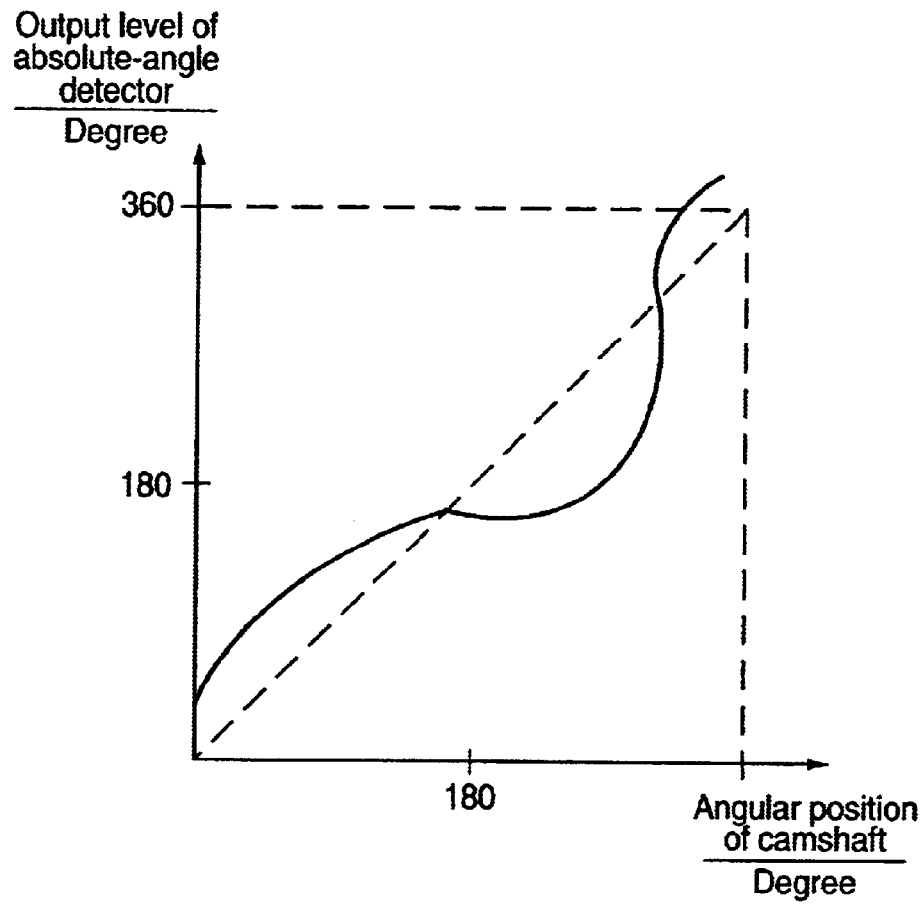
FIG. 3 shows a representation of the output signal of an absolute-angle detector.

FIG. 3 shows, by way of example, a conditioned output signal 2" of absolute-angle detector 2 over the actual angular position of camshaft 1. The required setpoint of the output signal of absolute-angle detector 2 is shown as a broken line for comparison purposes. As shown in FIG. 3, the deviation in conditioned output signal 2" of absolute-angle detector 2 is initially approximately plus 30 degrees. At an angular position of approximately 150 degrees, no deviation occurs for a short period of time. In the range from 150 degrees to around 190 degrees, the deviation is negative and reaches a value of approximately minus 30 degrees. At an angular position of around 290 degrees, the deviation once again passes through zero and becomes positive, again reaching roughly plus 30 degrees at 360 degrees.

Figure 4:
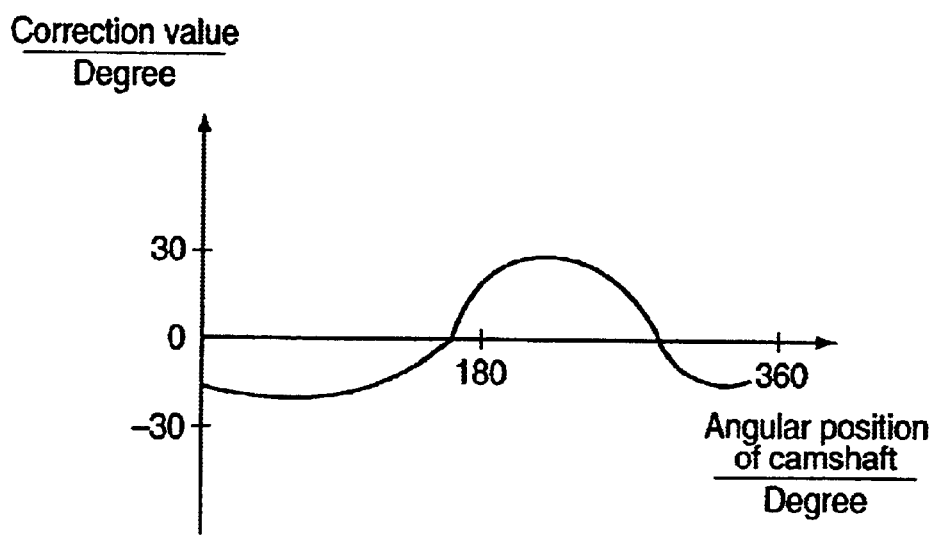
FIG. 4 shows a correction value according to the signal curve illustrated in FIG. 3.

FIG. 4 shows the correction value formed in correction stage 11. It corresponds to the deviation in the output signal of absolute-angle detector 2, with the mathematical signs reversed.

What is claimed is:

1. A method for correcting an angle error of an absolute-angle detector that detects an angular position of a first shaft having a rotary movement that is linked to a second shaft, comprising:

initially detecting an angular position of the second shaft during at least one complete revolution of the first shaft;

determining the angular position of the first shaft from the detected angular position of the second shaft;

comparing a corresponding output value of the absolute-angle detector to the angular position of the first shaft;

forming and storing a difference between the corresponding output value of the absolute-angle detector and the angular position of the first shaft; and correcting the corresponding output value of the absolute-angle detector in accordance with the stored difference;

wherein the determining, comparing, forming and correcting steps are performed during normal operation of the absolute-angle detector.

2. The method according to claim 1, further comprising:

repeatedly detecting and averaging errors assigned to respective angular positions; and storing mean values to be used for correction purposes.

3. The method according to claim 2, further comprising the step of:

continuously detecting one of the errors assigned to a particular one of the respective angular positions.

4. The method according to claim 1, further comprising:

correcting an error lying between two discrete values in accordance with a value interpolated from the two discrete values.

* * * * *